US012807217B2

(12) United States Patent
Ein Waldt et al.

(10) Patent No.: US 12,807,217 B2
(45) Date of Patent: Nov. 24, 2026

(54) METHODS FOR OPERATING A VEHICLE INCLUDING AN ELECTRONIC STEERING SYSTEM AND ELECTRONIC STEERING SYSTEMS FOR A VEHICLE

(71) Applicant: Ford Global Technologies, LLC, Dearborn, MI (US)

(72) Inventors: Alexander Ein Waldt, Cologne (DE); Oliver Nehls, Düsseldorf (DE); Sergio Codonesu, Aachen (DE); Gerhard Friederich, Bornheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/213,628

(22) Filed: May 20, 2025

(65) Prior Publication Data

US 2025/0368255 A1 Dec. 4, 2025

(30) Foreign Application Priority Data

Jun. 4, 2024 (DE) ......................... 102024115478.0

(51) Int. Cl.
*B62D 5/04* (2006.01)
*B60Q 9/00* (2006.01)

(52) U.S. Cl.
CPC ............. *B62D 5/0481* (2013.01); *B60Q 9/00* (2013.01); *B62D 5/046* (2013.01); *B62D 5/0475* (2013.01); *B62D 5/0484* (2013.01)

(58) Field of Classification Search
CPC .... B62D 5/0481; B62D 5/0484; B62D 6/002; B62D 5/046; B62D 5/0475; B62D 15/025; B60Q 9/00
See application file for complete search history.

(56) References Cited

U.S. PATENT DOCUMENTS 10,597,070 B2 * 3/2020 De Carteret ....... B62D 15/0245
11,780,493 B2 10/2023 Shimizu et al.
12,084,121 B2 9/2024 Albrecht et al.
(Continued)

FOREIGN PATENT DOCUMENTS

DE 102016009684 A1 2/2018
DE 102019135047 A1 6/2021
DE 112021004856 T5 8/2023

OTHER PUBLICATIONS

German Patent and Trademark Office, "Search Report," issued on Mar. 10, 2025 in connection with German Patent Application No. 102024115478.0, 8 pages (including machine translation).

*Primary Examiner* — Sizo B Vilakazi
(74) *Attorney, Agent, or Firm* — Lorne Forsythe; Hanley, Flight and Zimmerman, LLC

(57) ABSTRACT

The disclosure relates in general to methods for operating a vehicle including an electronic steering system and to electronic steering systems for a vehicle. An example method for operating a vehicle including an electronic steering system includes determining an expected value, associated with a steering wheel parameter, comparing a detected steering wheel parameter with the expected value, and if the detected steering wheel parameter exceeds the expected value, triggering at least one compensation measure so that a change in a road wheel angle of a steerable road wheel of the vehicle towards a target road wheel angle is damped.

20 Claims, 4 Drawing Sheets

(56) References Cited

U.S. PATENT DOCUMENTS

| | | | | |
|---|---|---|---|---|
| 2003/0141835 | A1* | 7/2003 | Zheng | B62D 5/0463 318/434 |
| 2004/0039507 | A1* | 2/2004 | Yao | B62D 5/006 180/443 |
| 2004/0138797 | A1* | 7/2004 | Yao | B62D 5/0463 180/443 |
| 2013/0144493 | A1* | 6/2013 | Hayama | B62D 6/00 701/43 |
| 2019/0144031 | A1* | 5/2019 | Bremkens | B62D 5/046 180/446 |
| 2019/0367074 | A1* | 12/2019 | Engels | B62D 5/006 |
| 2019/0367085 | A1* | 12/2019 | Kataoka | B62D 6/10 |
| 2020/0010112 | A1* | 1/2020 | Toko | B62D 5/0409 |
| 2023/0044665 | A1* | 2/2023 | Watanabe | B62D 5/006 |
| 2023/0174149 | A1* | 6/2023 | Nehls | B62D 5/006 |
| 2024/0025475 | A1 | 1/2024 | Hirata et al. | |

* cited by examiner

METHODS FOR OPERATING A VEHICLE INCLUDING AN ELECTRONIC STEERING SYSTEM AND ELECTRONIC STEERING SYSTEMS FOR A VEHICLE

RELATED APPLICATION

This patent claims priority from DE Patent Application No. 102024115478.0, which was filed on Jun. 4, 2024, and is hereby incorporated by reference in its entirety.

FIELD OF THE DISCLOSURE

The disclosure relates in general to methods for operating a vehicle including an electronic steering system and to electronic steering systems for a vehicle.

BACKGROUND

Electronic steering systems are a steering technology in which the mechanical connection between steering wheel and road wheel is omitted and replaced by two actuators: a steering wheel actuator with feedback, which generates a feedback torque for the driver (e.g., at the steering wheel), and a road wheel actuator, which adjusts the road wheels to the desired position.

BRIEF DESCRIPTION OF THE DRAWINGS

In general, the same reference numbers will be used throughout the drawing(s) and accompanying written description to refer to the same or like parts.

SUMMARY

Figure 1:
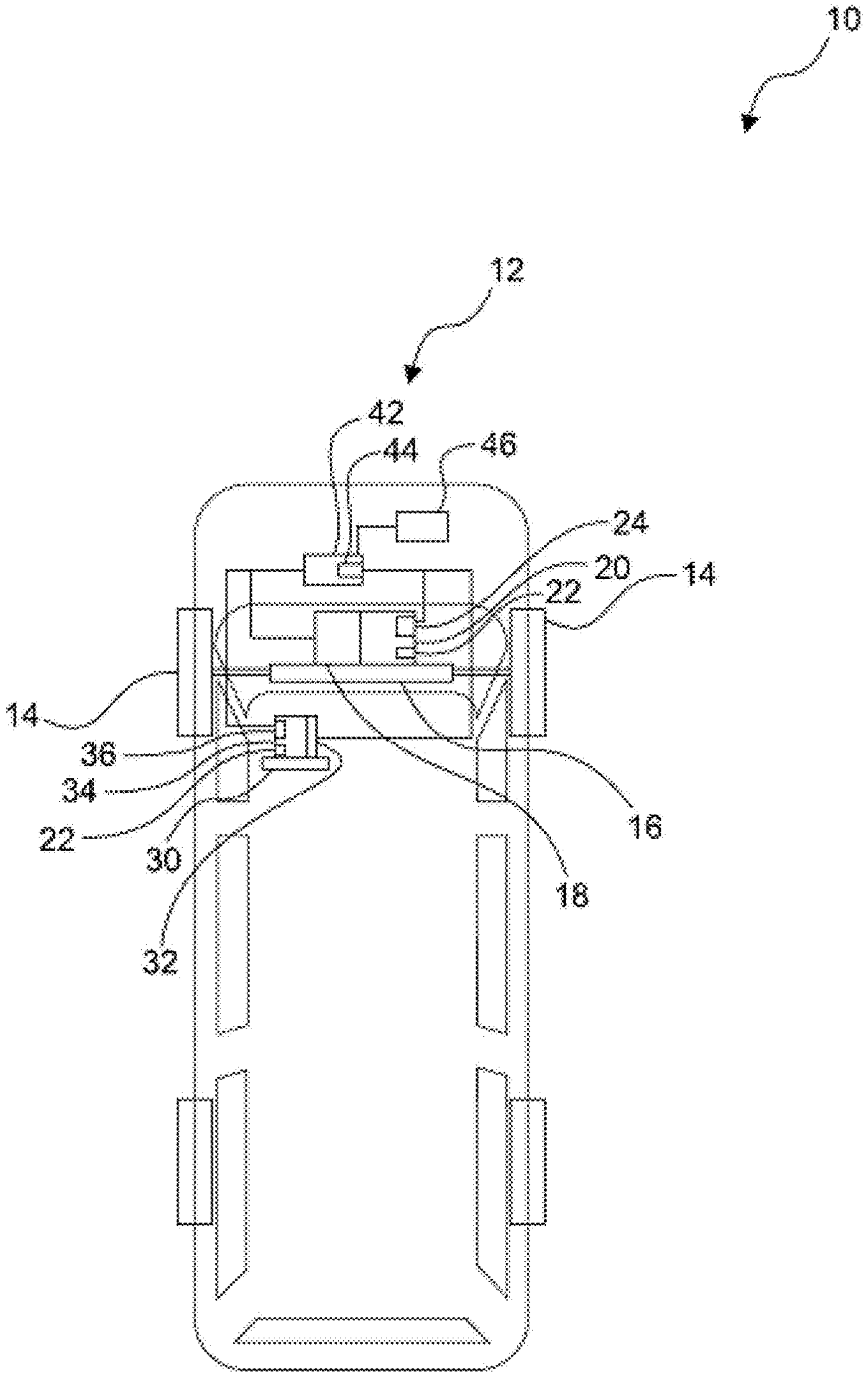
FIG. 1 shows a schematic illustration of an example vehicle including an electronic steering system according to the examples disclosed herein.

An example method for operating a vehicle including an electronic steering system includes determining an expected value, associated with a steering wheel parameter, comparing a detected steering wheel parameter with the expected value, and if the detected steering wheel parameter exceeds the expected value, triggering at least one compensation measure so that a change in a road wheel angle of a steerable road wheel of the vehicle towards a target road wheel angle is damped.

An example electronic steering system for a vehicle includes machine readable instructions, and a control device to execute the machine readable instructions to determine an expected value, associated with a target road wheel angle parameter, compare a detected target road wheel angle parameter with the expected value, and if the detected target road wheel angle parameter exceeds the expected value, trigger at least one compensation measure so that a change in a road wheel angle of a steerable road wheel towards a target road wheel angle is damped.

An example non-transitory machine readable storage medium includes instructions to cause programmable circuitry to at least determine an expected value, associated with a steering wheel parameter, compare a detected steering wheel parameter with the expected value, and if the detected steering wheel parameter exceeds the expected value, trigger at least one compensation measure so that a change in a road wheel angle of a steerable road wheel of a vehicle towards a target road wheel angle is damped.

DETAILED DESCRIPTION

In steer by wire (SbW) systems, the desired road wheel angle (e.g., corresponding signals, a pinion angle, or a steering rack travel) is determined and electronically controlled based on the measured steering wheel angle. This calculation represents the simulated steering ratio between the steering wheel and the steerable road wheels and can be modified such that the driver obtains the optimal response depending on the current driving situation, for example, the vehicle speed. The desired feedback torque at the steering wheel is generated by the steering wheel actuator based on algorithms and vehicle signals. The steering wheel actuator is connected to the steering wheel via the upper steering column.

In examples disclosed herein, the phrases “unexpected operating condition”, “limited operating condition”, “unexpected operating state”, and “limited operating state” can be used interchangeably to refer to a condition or a state of a component that is unavailable, inoperable, and/or operating outside of an operating specification performance range of the component. An unexpected operating condition can occur within the electronic steering system, for example, unintentional torque generation (“self-steering”) via the steering wheel actuator, which results in an increase in the steering wheel rotational speed if the driver is not able to at least partially counteract the torque. Due to the substantially lower inertia and a normally lower friction of the steering wheel actuator compared to a conventional electric power steering system (EPS), the resultant increase in the steering wheel rotational speed for the same torque is greater. For example, driving situations can occur in which the driver is holding the steering wheel loosely or the driver takes their hands off the steering wheel (“hands off”). The change in the steering wheel angle resulting from the self-steering of the steering wheel actuator results in a change in the steering wheel angle command and therefore in unintentional steering of the steerable road wheels. Other unexpected operating conditions can also occur in association with the steering wheel actuator, for example, sensor inoperability, which can have similar effects.

In addition, unexpected operating conditions in respect to the road wheel actuator or a road wheel sensor can also occur, for example, if due to a limited signal transmission, the road wheel angle does not correspond to the detected steering wheel angle. Similar to the effect of self-steering operating under unexpected conditions, a limited operating condition of the road wheel actuator (e.g., a gear or a control channel thereof) or of a road wheel sensor might result in a significant change. Since these unexpected operating conditions result in greater changes compared to conventional steering systems, the time taken to detect and correct these unexpected operating conditions needs to be shortened, which gives rise to significant complexity.

In this regard, U.S. Pat. No. 11,780,493 B2 discloses reducing a maximum speed because of detecting an unexpected operating condition. DE 10 2016 009 684 A1 and DE 10 2019 135 047 A1 describe adapting a control behavior because of detecting an unexpected operating condition to continue using the steering system. However, the approaches adopted to date have merely been concerned with the usability of the steering system. In other words, previous approaches have not addressed efficient unexpected operating condition detection and precise lateral control of the vehicle according to the driver's input.

Examples disclosed herein overcome the disadvantages of known methods for operating a vehicle including an electronic steering system and of electronic steering systems for vehicles. In particular, examples disclosed herein provide for electronic steering systems and methods for operating vehicles including electronic steering systems wherein, in the event of an unexpected operating condition, a path divergence from a desired trajectory can be reduced compared to previous approaches, while keeping complexity relatively low.

Some examples disclosed herein are reflected in the independent claims. The dependent claims and the description below each can represent aspects of the described examples independently or in (sub) combinations. Some features are explained with respect to example methods, others with respect to example devices. However, corresponding aspects are mutually transferrable in a corresponding manner.

According to one aspect, some examples of the disclosure relate to example methods for operating a vehicle including an electronic steering system. The electronic steering system includes at least one steering wheel actuator, a steering wheel coupled to the steering wheel actuator, a road wheel actuator, a steerable road wheel coupled to the road wheel actuator and a control device. The control device is coupled at least to the steering wheel actuator and the road wheel actuator. The control device is configured to control the road wheel actuator depending on a detected steering wheel angle of the steering wheel in such a way that the steerable road wheel assumes a target road wheel angle, defined by the detected steering wheel angle, according to a transfer function. The transfer function describes a dependence of the target road wheel angle on the detected steering wheel angle. The example method includes at least the following operations. First, at least one expected value is determined by the control device, the expected value is associated with at least one steering wheel parameter and/or a target road wheel angle parameter, At least one detected steering wheel parameter and/or a detected target road wheel angle parameter is compared with the at least one expected value associated therewith via the control device. If the at least one detected steering wheel parameter and/or detected target road wheel angle parameter exceeds or falls short of the expected value associated therewith at least one compensation measure is triggered by the control device so that a change in a road wheel angle of the at least one steerable road wheel towards the target road wheel angle based on the detected steering wheel angle is at least delayed, diminished, or damped.

The example method is based on the recognition that corresponding expected values for the corresponding detected parameters of the steering system can be determined in advance (e.g., before they are detected). As a result, part of the process for determining unexpected operating conditions can be brought forwards, whereby the time frame for determining the presence of unexpected operating conditions, as calculated based on the actual detection of the corresponding parameters of the steering system, can be shortened. In turn, the compensation measures can be triggered earlier and therefore take effect earlier so that the effects of the unexpected operating conditions can be reduced, diminished, or at least damped. In some examples, the time frame for applying the compensation measures can be extended. In some examples, the time frame for determining that an unexpected operating condition has occurred can be extended if only a limited time frame for applying the compensation measure is needed. This means that the determining of unexpected operating conditions is more robust (e.g., more reliable). The example method therefore generally ensures that the path divergence of the actual trajectory of the vehicle from the trajectory input by the driver is smaller than before. In addition, complex sensor configurations or technically complex detection techniques or the like are not needed to implement the example method, which means that complexity for the example method is relatively low.

Some examples of the disclosure also relate to electronic steering systems for a vehicle. The electronic steering system includes at least one steering wheel actuator, a steering wheel coupled to the steering wheel actuator, a road wheel actuator, a steerable road wheel coupled to the road wheel actuator, and a control device. The control device is coupled at least to the steering wheel actuator and the road wheel actuator. The control device is configured to control the road wheel actuator based on a detected steering wheel angle of the steering wheel in such a way that the steerable road wheel assumes a target road wheel angle, defined by the detected steering wheel angle, according to a transfer function. The transfer function describes the dependence of the target road wheel angle on the detected steering wheel angle. The control device is configured to determine at least one expected value, is the value associated with at least one steering wheel parameter and/or a target road wheel angle parameter, and to compare at least one detected steering wheel parameter and/or a detected target road wheel angle parameter with the at least one expected value associated therewith.

The control device is also configured so that, if the at least one detected steering wheel parameter and/or detected target road wheel angle parameter exceeds or falls short of the expected value associated therewith, it triggers at least one compensation measure so that a change in a road wheel angle of the at least one steerable road wheel towards the target road wheel angle on the basis of the detected steering wheel angle is at least delayed, diminished, or damped.

The advantages achieved by the example methods described herein are also achieved accordingly by the example electronic steering systems.

The steering wheel actuator does not necessarily have to be directly coupled to the steering wheel. For example, the steering wheel actuator can also be coupled to a steering wheel shaft (e.g., steering column) to which the steering wheel is fastened.

The road wheel actuator likewise does not have to be directly coupled to the steerable road wheel of the vehicle. For example, the road wheel actuator can be coupled to a steering rack of the electronic steering system, which is in turn coupled to the steerable road wheels.

For the sake of simplicity, the control device is configured as a common control device for the whole electronic steering system.

In some examples, however, different control devices can also be provided, which cooperate with the steering wheel actuator and with the road wheel actuator. In such examples, the control devices, which are associated with the respective actuators, can generally ensure the control functions of the respective actuator. Nevertheless, an additional control device can be provided, which, in terms of the functionality of the illustrated example method, is configured as a superordinate control device of the example electronic steering system or an example vehicle.

In addition to the control device, the actuators can therefore include intrinsic actuator control devices, which are configured to receive actuating signals which define a desired movement of the mechanical component coupled to the actuator (e.g., the steering wheel, steering column, or steering rack) which is to be induced by the respective actuator. The actuator control devices can be configured to control the respective actuator accordingly based on an actuating signal received by the control device of the example electronic steering system.

Each actuator includes an electric motor, based on which a movement of the mechanical component coupled to the actuator can be induced. To prompt a movement of the mechanical component, corresponding phase voltages can be applied to windings of the electric motor, for example. The actual control of the phase voltages corresponding to their time sequence and amplitude can then take place via the actuator control devices based on the actuating signal received by the control device.

In some examples, the control device can also be configured to control the electric motors of the actuators directly. This means that the control device can control the electric motors based on corresponding actuating signals via which corresponding phase voltages are defined directly.

The transfer function represents the simulated coupling between the steering wheel, used for a steering input by the driver of the vehicle, and the steerable road wheels of the vehicle. Ultimately, the transfer function enables the appropriate conversion of the steering input from the driver of the vehicle into the desired lateral control of the vehicle. To this end, the current road wheel angle is changed to a target road wheel angle according to the steering input, which target road wheel angle is established because of the detected steering wheel angle, considering the transfer function. In addition, information relating to the current driving information or road information can be made available to the driver via a torque response which is provided for the driver at the steering wheel and which, in this respect, is also based indirectly on the transfer function. This torque response can be determined based on various information (e.g., steering wheel angle, road wheel angle, vehicle speed, and/or steering force of the road wheel actuator). This torque response is also described as torque feedback.

The expected value, which is associated with at least one steering wheel parameter and/or a target road wheel angle parameter, corresponds to a maximum value (e.g., or minimum value, depending on the definition) expected for the respective steering wheel parameter and/or target road wheel angle parameter. In other words, the expected value can be regarded as an upper (e.g., or lower, depending on definition) threshold value for the steering wheel parameter and/or the target road wheel angle parameter. This means that it is of no relevance to the comparison if the detected steering wheel parameter and/or target road wheel angle parameter is smaller than the expected value (e.g., if it is in a normal parameter range corresponding to the expected value for the respective parameter). In this case, normal functionality ("expected system condition") can be assumed. What is relevant, however, is whether the detected parameter exceeds or falls short of the expected value relative to a previous control period. This means that, if the detected steering wheel parameter and/or target road wheel angle parameter was initially smaller or greater than the expected value, it should be determined whether the steering wheel parameter and/or target road wheel angle parameter detected in a subsequent control period is now smaller or greater than the corresponding expected value. In other words, for comparison purposes, it is determined whether the relative size relationships (e.g., sign relationships of a difference calculated for comparison purposes) of the expected value relative to the detected parameter have changed.

A substantial divergence of a detected steering wheel parameter and/or a detected target road wheel angle parameter from the respectively associated expected value can be based on various unexpected operating conditions of the electronic steering system. For example, the detected steering wheel parameter and/or target road wheel angle parameter can differ substantially from the expected value due to a limited operating condition of the steering wheel actuator or of the road wheel actuator and can exceed or fall short of this expected value. In addition, unexpected self-steering of the electronic steering system can result in the detected parameter differing from the expected value and exceeding or falling short of this expected value. The unexpected self-steering of the steering wheel actuator can be triggered, for example, by a limited operating condition of the steering wheel actuator, for example by a limited feedback channel of a corresponding actuator control device. In addition, the divergence can also be attributed to a limited operating condition of a steering wheel sensor or a road wheel sensor used to detect the steering wheel angle or the road wheel angle. Further possible causes can also be a limited signal transmission between components of the electronic steering system, for example, due to a limited signal line or communication interface.

In some examples, the example method can include the operation of determining an effect of the unexpected operating condition of the electronic steering system via the control device. To this end, the control device can determine the amount (e.g., the value) by which the correspondingly detected parameter exceeds or falls short of the expected value.

Based on the amount (e.g., the value) by which the detected parameter exceeds or falls short of the expected value, and considering the transfer function, the control device can then determine the road wheel angle change that would be caused by the unexpected operating condition (e.g., without a compensation measure). In this case, the compensation measure can then be calculated based on the amount (e.g., the value) by which the detected parameter exceeds or falls short of the expected value. This means that the compensation measure can be established by the control device in such a way that the effects of the unexpected operating condition can be mitigated or delayed. As a result, it is possible to tailor the compensation measure so that the path divergence can be additionally reduced.

For example, unexpected self-steering can result in a movement of the steering wheel, which can be detected because of exceeding a corresponding expected value. This movement of the steering wheel (e.g., considering the original transfer function) induces a road wheel angle change of the steerable road wheels of the vehicle. In the present case, this road wheel angle change can be estimated by the control device of the electronic system and it can minimized, delayed, or damped via the compensation measure.

To determine the effect of the unexpected operating condition of the electronic steering system, the control device, in some examples, relativizes the target road wheel angle change, which is based on the detected parameter exceeding or falling short of the expected value, via the transfer function or via a respective operating point of the transfer function. The transfer function describes the normal non-linear dependence (although a linear dependence is generally also possible) of the road wheel angle on the steering input (e.g., on the detected steering wheel angle). Therefore, the transfer function generally has a non-linear curve progression. Depending on the operating point of the electronic steering system, characteristics or characteristic fields (e.g., vehicle parameter, driving situation, or vehicle personalization mode) are generally used for the relevant description of the interdependence between the road wheel angle and the steering wheel angle. "To relativize" therefore means for the purposes of this disclosure, that the relevant transfer function for the respective operating configuration (e.g., operating point) is considered to determine the road wheel angle change based on the detected parameter exceeding or falling short of the expected value that is caused by the unexpected operating condition. From a mathematical point of view, "to relativize" can therefore mean, for example, a division or multiplication depending on the definition of the transfer function. This is because the product or the relationship between the transfer function and the detected steering wheel angle (e.g., steering wheel angle change) gives the target road wheel angle (e.g., target road wheel angle change) which is to be induced as a result of this detected steering wheel angle (e.g., steering wheel angle change). As a result, different electronic steering systems and/or vehicles with different transfer functions can be accounted for. For example, if the dimensions of corresponding components (e.g., the steering rack, the steerable road wheels) or, in general, the resistance values of the vehicle during the lateral control vary. In other words, the change in the detected steering wheel angle is therefore considered in relation to the respective, specific electronic steering system for a respective vehicle. By considering different transfer functions for different electronic steering systems of vehicles, the example method can therefore be applied to a plurality of different electronic steering systems. The configurability of the example method is therefore increased.

The electronic steering system can include at least one steering wheel sensor, which is configured to detect a position and/or a movement of the steering wheel or a component coupled thereto (e.g., a steering column). For example, the steering wheel sensor can be configured to detect a steering wheel rotational speed.

In some examples, the steering wheel sensor can be part of the steering wheel actuator or it can be coupled thereto.

In some examples, the steering wheel sensor can also be coupled to the steering wheel separately from the road wheel actuator.

The electronic steering systems can include at least one road wheel sensor, which is configured to detect a position, a movement, and/or a setting of a steerable road wheel or a component coupled thereto (e.g., a steering rack). For example, the road wheel sensor can be configured to detect a road wheel angle.

In some examples, the road wheel sensor can be part of the road wheel actuator or it can be coupled thereto.

In some examples, the road wheel sensor can also be coupled to the steering wheel separately from the road wheel actuator.

In some examples, road wheel sensors and/or steering wheel sensors can be coupled to the control device and can transmit corresponding measured values to the control device.

In some examples, an actuating signal is output to the road wheel actuator by the control device considering the compensation measure, so that the road wheel angle change, which is based on the effect on the road wheel angle (e.g., road wheel angle change) that is determined in connection with the detected parameter exceeding or falling short of the expected value, is at least reduced or even compensated. In this regard, an actuating signal which is adapted compared to the unchanged configuration (e.g., without a compensation measure) is output to the road wheel actuator so that the lateral control of the vehicle advantageously corresponds more precisely to the steering input which is provided by the driver (e.g., without exceeding or falling short of the expected value).

In some examples, the compensation measure is cancelled if the at least one detected steering wheel parameter and/or detected target road wheel angle parameter, after initially exceeding or falling short of the expected value associated therewith, does not exceed or fall short of this expected value again within a predetermined monitoring period. As a result, the option is provided of quickly identifying false positive detection results and returning to the original configuration (e.g., without a compensation measure). For example, the detected parameter can exceed or fall short of the expected value once because of interference. In this case, the effects on the electronic steering system are low because the compensation measure is cancelled after the monitoring period.

In some examples, the monitoring period can be predefined, constant or variable. For example, the monitoring period can depend on vehicle parameters, a driving situation, or a vehicle personalization mode. The vehicle parameters can include, for example, speed, yaw rate, a change in the lateral vehicle speed or the like. The driving situation can include, for example, a parking maneuver, an autonomous or partially autonomous driving function, a high speed situation (e.g., on an expressway), city driving or the like. The vehicle personalization mode can include, for example, various operating modes of the vehicle, such as sport mode, comfort mode, off-road mode, or operating modes of the vehicle in which specific functionalities are deactivated, for example an electronic stability program. To determine the respective vehicle parameters, driving situations or the vehicle personalization mode, sensor data from additional sensors of the vehicle can be used, based on which the control device can determine the respective driving situation. In some examples, the control device can also communicate with a superordinate driving control device of the vehicle, from which the control device of the electronic steering system receives corresponding information, for example, also in respect to the driving situation or vehicle parameters.

In some examples, the monitoring period begins with the detected parameter exceeding or falling short of the expected value for the first time and continuing over a specific time frame.

In some examples, the monitoring period can be at least 10 ms and at most 1000 ms. In some examples, the monitoring period can be between 50 ms and 800 ms. Further, in some examples, the monitoring period can be between 100 ms and 500 ms. Additionally, in some examples, the monitoring period can be between 150 ms and 300 ms.

In some examples, a reaction measure can be triggered by the control device if an unexpected operating condition in the electronic steering system is identified by the control device within the monitoring period via a system diagnosis. As a result, the electronic steering system can be checked for proper functionality, which enables causes for the detected parameter exceeding or falling short of the respective expected value to be ruled out. In this regard, the reaction measure enables at least ongoing adaptation of the system configuration of the electronic steering system to mitigate against or remove the causes for exceeding or falling short of the expected value, at least until servicing or maintenance of the electronic steering system. Consequently, based on the reaction measure, the detected parameter can be prevented from exceeding or falling short of the expected value again.

In some examples, the reaction measure can include deactivating the compensation measure, for example. In some examples, the reaction measure can include deactivating a further measure, for example, deactivating a inoperable control device or a single limited control channel of a control device. The reaction measure can also involve triggering a more suitable system setting of the electronic steering system. In some examples, the reaction measure can include outputting a unexpected operating condition report to the driver, for example, via a display (e.g., a multifunctional device) or a speaker belonging to the vehicle.

In some examples, the monitoring period is restarted by the control device if the at least one detected steering wheel parameter and/or detected target road wheel angle parameter, after initially exceeding or falling short of the expected value associated therewith, exceeds or falls short of this expected value again within the predetermined monitoring period. In this regard, the time frame within which it is established whether the detected parameter has exceeded or fallen short of the expected value again is extended. This enables the presence of ongoing interference or merely random, spontaneous events to be established.

For redundancy reasons, the control devices (e.g., including those of the different actuators) generally have several mutually independent control channels, including corresponding sensors and actuator channels (e.g., with several mutually independent winding sets of an electric motor and convertor for the control thereof), one of which can be responsible for exceeding or falling short of the expected value. The corresponding control channel or the corresponding component thereof can be deactivated. In addition, the driver can be informed of the unexpected operating condition so that corresponding maintenance measures can be implemented.

In some examples, the steering wheel parameter includes a steering wheel rotational speed and/or a steering wheel speed change.

In some examples, the target road wheel angle parameter includes a target road wheel angular speed and/or a change in the target road wheel angular speed.

This means that the control device considers the change with respect to the previous control period to determine the steering wheel rotational speed and/or a steering wheel speed change based on a sequence of detected steering wheel angles or a target road wheel angular speed and/or a change in the target road wheel angular speed on the basis of detected road wheel angles.

In some examples, the steering wheel rotational speed (e.g., a steering wheel speed change), or a target road wheel angular speed (e.g., a change in the target road wheel angular speed) can also be detected directly, for example, via speed sensors or speed-change sensors.

The expected value can then be produced accordingly in respect to the steering wheel rotational speed (e.g., a steering wheel speed change) or the target road wheel angular speed (e.g., the change in the target road wheel angular speed).

The road wheel angle is generally detected because the torque response to be provided for the driver at the steering wheel is determined on the basis thereof. The detected road wheel angle is also needed for the adjustment to the desired road wheel angle (e.g., the setpoint for the road wheel angle for a specific control period). To this end, the steering system includes at least one road wheel sensor, which is configured to detect the road wheel angle.

In some examples, the expected value can include several partial expected values, which are associated with different parameters of the electronic steering system.

In some examples, the at least one expected value is variable. This means that the expected value can assume different values for different control periods.

The expected value in some examples depends on at least one of a vehicle parameter, a driving situation, or a vehicle personalization mode. As a result, the expected value can be adapted to the respective vehicle parameter, the driving situation, and/or the vehicle personalization mode.

In some examples, the control device is configured to control the steering wheel actuator, amongst other things based on a detected road wheel angle, in such a way that the steering wheel actuator applies a feedback torque to the steering wheel.

In some examples, the compensation measure includes at least one of changing the original transfer function to a changed transfer function, filtering the detected steering wheel angle, activating an additional damping torque which is applied to the steering wheel or to a component coupled thereto, modifying the target road wheel angle, filtering the target road wheel angle, or changing a control routine of the road wheel actuator.

The electronic steering system can therefore be influenced in different ways. As a result, a wide range of adaptation options for the electronic steering system is ensured to diminish, damp, delay, or compensate the effect of the detected parameter of the steering system exceeding or falling short of the expected value.

The changed transfer function generally ensures that the road wheel angle change relative to the detected steering wheel angle is induced in a more indirect or damped manner compared to the unchanged (e.g., original) transfer function. The changed transfer function here can depend, on the amount (e.g., the value, the extent) by which the correspondingly detected parameter of the electronic steering system exceeds or falls short of the expected value. If the detected parameter exceeds or falls short of the expected value significantly, the transfer function can therefore be changed differently compared to when the detected parameter exceeds or falls short of the expected value only slightly. As a result, the compensation measure can be adapted according to the amount by which the detected parameter exceeds or falls short of the expected value. Because of the changed transfer function, the detected steering wheel angle induces a more indirect (e.g., more damped and/or delayed) road wheel angle change compared to an unchanged transfer function. The changed transfer function is therefore more indirect than the unchanged (e.g., original) transfer function. Therefore, when determined via the changed transfer function, the target road wheel angle value for the induced road wheel angle change can be smaller than that determined via the unchanged transfer function. As a result, the effects on the lateral vehicle control which are caused by the detected parameter exceeding or falling short of the expected value can be directly diminished or even compensated.

As a result of filtering the detected steering wheel angle or the target road wheel angle, an automatic (e.g., ongoing) influence can be exerted on the steering wheel input of the steering wheel or on the target road wheel angle to be set. The steering wheel input of the steering wheel can be determined, for example, via the detected steering wheel angle. The filtering measure can then be applied automatically to the detected steering wheel angle (e.g., or the target road wheel angle), for example, to diminish the effects of exceeding or falling short of the expected value.

In some examples, the filtering measure includes low-pass filtering of the detected steering wheel angle or the target road wheel angle. As a result, the effects on the lateral vehicle control can be, smoothed or reduced in terms of magnitude. The activation of an additional damping torque represents an indirect compensation measure since, because of this damping torque, the torque response for the driver is increased and therefore the movement of the steering wheel is slowed down. This results in the driver reacting with steering inputs of smaller magnitude, whereby the consequences of the unexpected operating condition, for example, unexpected self-steering, can be reduced more easily than they would be without these measures. Consequently, a possible overreaction on the part of the driver due to an unexpectedly induced road wheel angle can be smaller than it would be without this compensation measure.

It can, thus, be avoided that the driver of the vehicle reacts too strongly to the unexpected operating condition due to the unexpected torque response.

The damping torque can be produced, for example, via an electronic damping torque (e.g., an induced electrical resistance) or a mechanical damping torque (e.g., additional mechanical friction).

The modification of the target road wheel angle can include, for example, considering a correction factor via which the modified target road wheel angle, calculated based on the detected steering wheel angle, is set more indirectly than it would be without the modification.

The change in the control routine of the road wheel actuator can equate to the activation of a modified control curve so that, depending on actuating signals received in each case, a modification of the target road wheel angle is reduced compared to the configuration without a change to the control routine.

All example compensation measures generally ensure that the effects of the unexpected operating condition on the electronic steering system are ultimately reduced, or even compensated (e.g., steers with greater damping). In other words, the compensation measures induce a lesser response of the electronic steering system based on the detected steering wheel angle.

In some examples, several of the compensation measures mentioned by way of example can be triggered in parallel or sequentially.

In some examples, an offset angle caused by the changed transfer function is at least partially reduced, or even compensated, via the changed transfer function as part of the compensation measure. In effect, the changed transfer function induces an offset in the target road wheel angle (e.g., depending on the detected steering wheel angle) compared to the unchanged transfer function. This offset is at least partially compensated (e.g., reduced or balanced out entirely), namely based on the changed transfer function which helps to ensure the reduction in the offset (e.g., compensation thereof) in such examples.

In some examples, the offset angle can be reduced (e.g., compensated) over an offset time period. The offset time period begins with the change in the transfer function. The changed transfer function is then adapted (e.g., continuously) in such a way that the offset relative to the unchanged transfer function is balanced out at least during the offset time period (e.g., in a continuous manner), and namely in relation to the road wheel angle change induced by the changed transfer function. A comfortable, subtle adjustment can, thus, be ensured so that sudden changes for the user are avoided.

In some examples, the example methods are configured as computer-implemented methods. This means that the example method operations can be executed with the help of one or more data processing devices. For example, a data processing device can trigger or execute the appropriate operations.

Some examples also relate to computer program products, including commands which, when the programs are executed by a computer, prompt the latter to execute the example methods as described herein. The advantages achieved by the example methods described herein are also achieved accordingly by the example computer program products.

Some examples also relate to computer-readable storage mediums, including commands which, when the programs are executed by a computer, prompt the latter to execute the example methods as described herein. The advantages achieved by the example methods described herein are also achieved accordingly by the example computer-readable storage mediums.

Some examples also relate to vehicles including an electronic steering system. The advantages achieved by the example methods described herein are also achieved accordingly by example vehicles.

In the context of the disclosure, vehicles can include agricultural vehicles, off-road and road vehicles (e.g., automobiles), busses, trucks, and other utility vehicles. Vehicles can be manned or unmanned. Vehicles can at least sometimes be electrically driven and can have an internal combustion engine and/or an electric motor serving as the drive.

All described examples can be combined with other aspects individually or in (sub) combinations.

The following detailed description in conjunction with the accompanying drawings, in which the same numerals refer to the same elements, shall describe various examples of the disclosed subject matter and is not intended to represent the only examples. Each example described serves merely by way of example or illustration and should not be interpreted as preferred or advantageous over other examples. The illustrative examples contained herein raise no claim to completeness and do not limit the claimed subject matter to the exact disclosed forms. Various alterations to the described examples are clearly obvious to a person skilled in the art and the general principles defined herein can be applied to other examples and applications without deviating from the spirit and scope of the examples described. Therefore, the described examples are not limited to the examples shown but have the greatest possible range of application consistent with the principles and features disclosed herein.

All features described below with reference to the described examples and/or the accompanying figures can be combined with features of the described examples, individually or in any sub combinations, provided the resultant feature combination is meaningful to a person skilled in the art.

For the purposes of the disclosure, the formulation "at least one of A, B and C" means, for example, (A), (B), (C), (A and B), (A and C), (B and C) or (A, B and C), including all further possible combinations if more than three elements are listed. In other words, the wording "at least one of A and B" means, in general, "A and/or B", namely "A" alone, "B" alone or "A and B".

FIG. 1 shows a schematic illustration of a vehicle 10 including an electronic steering system 12 according to an example. The vehicle 10 also includes steerable road wheels 14. The steerable road wheels 14 are coupled to a common steering rack 16. The common steering rack 16 can be moved from a reference position, for example, a neutral position, which induces a steering movement of the steerable road wheels 14. The steerable road wheels 14, for example, starting from a straight-ahead direction of the vehicle 10, can therefore be deflected so that the vehicle 10 executes a cornering maneuver. The steerable road wheels 14 therefore have different road wheel angles during a deflection, for example, of the steering rack 16.

Although only front wheel steering is illustrated here, the vehicle 10 in some examples can have rear wheel steering instead or in addition.

To move the steering rack 16, the electronic steering system 12 has a road wheel actuator 18. In the illustrated example, the road wheel actuator 18 is coupled to the steering rack 16. In some examples, the road wheel actuator 18 can also be coupled to the steerable road wheels 14 in another manner to be able to influence the alignment (e.g., road wheel angle) thereof.

According to the illustrated example, the road wheel actuator 18 includes an electric motor 20. The electric motor 20 includes at least one winding set 22, which includes a group of windings. Each winding set 22 is configured so that, when supply signals, such as phase voltages, are applied thereto, phase currents are generated in the underlying windings, which phase currents can be used to drive a rotor of the electric motor 20. The rotor can then be coupled to the steering rack 16 and, thus, enable the movement of the steering rack 16. The electric motor 20 can generally have more than one winding set 22.

Typically, each winding set 22 is three-phase, so that the electric motor 20 in the present case is likewise configured as a three-phase motor. However, in some examples, the electric motor 20 can also include more winding sets 22 and is then configured accordingly as a six-phase or nine-phase or, in general, as a $3n$-phase motor, with n being greater than or equal to 1.

The road wheel actuator 18 also includes at least one road wheel sensor 24. In some examples, several road wheel sensors 24 can generally also be provided. The road wheel sensor 24 is configured to detect a position (e.g., a road wheel angle) and/or a movement (e.g., a road wheel angular speed) and/or a speed change (e.g., a road wheel angular speed change) of the steerable road wheels 14 or a component coupled thereto, in this case the steering rack 16. The detection of the position of the steering rack 16 enables the determining of the road wheel angle of the steerable road wheels 14. The alignment of the steerable road wheels 14 can, thus, be determined.

Although the road wheel sensor 24 is configured as part of the road wheel actuator 18 in the illustrated example, road wheel sensors 24 can, in some examples, also be arranged separately from the road wheel actuator 18 and yet still be configured to detect a position and/or a movement of the steerable road wheels 14 of the vehicle or a component coupled thereto. By way of example, the road wheel sensor 24 can be coupled to the steering rack 16 separately from the road wheel actuator 18.

The electronic steering system 12 of the vehicle 10 moreover includes a steering wheel 30. Via the steering wheel 30, a driver of the vehicle 10 can provide steering input to the vehicle 10 to steer the vehicle 10 in a desired direction.

A steering wheel actuator 32 of the electronic steering system 12 is coupled to the steering wheel 30. The steering wheel actuator 32 has a further electric motor 34. The electric motor 34 of the steering wheel actuator 32 includes a winding set 22. In some examples, the electric motor 34 can generally also include several winding sets 22. The winding set 22 of the electric motor 34 of the steering wheel actuator 32 is configured in a corresponding manner to the winding set 22 of the electric motor 20 of the road wheel actuator 18. This means that the winding set 22 of the electric motor 34 is configured to drive a rotor of the electric motor 34. Consequently, a torque can be applied to the steering wheel 30 of the vehicle 10 by the electric motor 34, which torque represents a response torque for the driver to impart a sense of the lateral control of the vehicle 10 to the driver.

In the illustrated example, the electric motor 34 of the steering wheel actuator 32 includes a winding set 22 and, is a three-phase motor, although it can also be configured as a $3n$-phase motor, with n being greater than or equal to 1.

The electronic steering system 12 moreover includes a steering wheel sensor 36, which is part of the steering wheel actuator 32. A plurality of steering wheel sensors 36 can generally also be provided. The steering wheel sensor 36 is configured to detect a steering input from the driver based on a steering wheel angle of the steering wheel 30, or a component (e.g., a steering column) coupled thereto, relative to a reference position.

In some examples, the steering wheel sensor 36 can also be separate from the steering wheel actuator 32 and yet still be configured to detect a position (e.g., a steering wheel angle) and/or a movement (e.g., a steering wheel rotational speed) and/or a speed change (e.g., a steering wheel speed change) of the steering wheel 30 of the vehicle 10 or a component (e.g., a steering column) coupled thereto.

In the illustrated example, the electronic steering system 12 of the vehicle 10 includes a control device 42. The control device 42 includes at least one data processing device 44 and is coupled to the road wheel actuator 18, the road wheel sensor 24, the steering wheel actuator 32 and the steering wheel sensor 36.

In some examples, the electronic steering system 12 can generally also include separate control devices, which are each individually associated with the road wheel actuator 18 and the steering wheel actuator 32. In the illustrated example, however, the control functions are combined in a single control device 42.

In addition, the electronic steering system 12 can include at least one storage device 46, which is coupled to the control device 42. The storage device 46 is configured to enable appropriate parameters of the electronic steering system 12 to be stored therein, for example, characteristics, characteristic fields, predefined expected values, transfer functions for different driving situations, vehicle parameters, or vehicle personalization modes.

The control device 42 acts as a link between the road wheel actuator 18 and the steering wheel actuator 32 to induce a wheel angle change of the steerable road wheels 14 of the vehicle 10 depending on the steering input provided by the driver via the steering wheel 30, and to ensure a torque response for the driver of the vehicle 10 at the steering wheel 30 based on vehicle and/or actuator information.

In the present case, the control device 42 is configured to execute the method explained with reference to FIG. 2. To this end, the control device 42 can receive and evaluate sensor data of the road wheel sensor 24, the steering wheel sensor 36 and/or information from a superordinate driving control device of the vehicle 10 (not illustrated).

In addition, the control device 42 is configured to file and retrieve parameters, characteristics or the like stored in the storage device 46.

Figure 2:
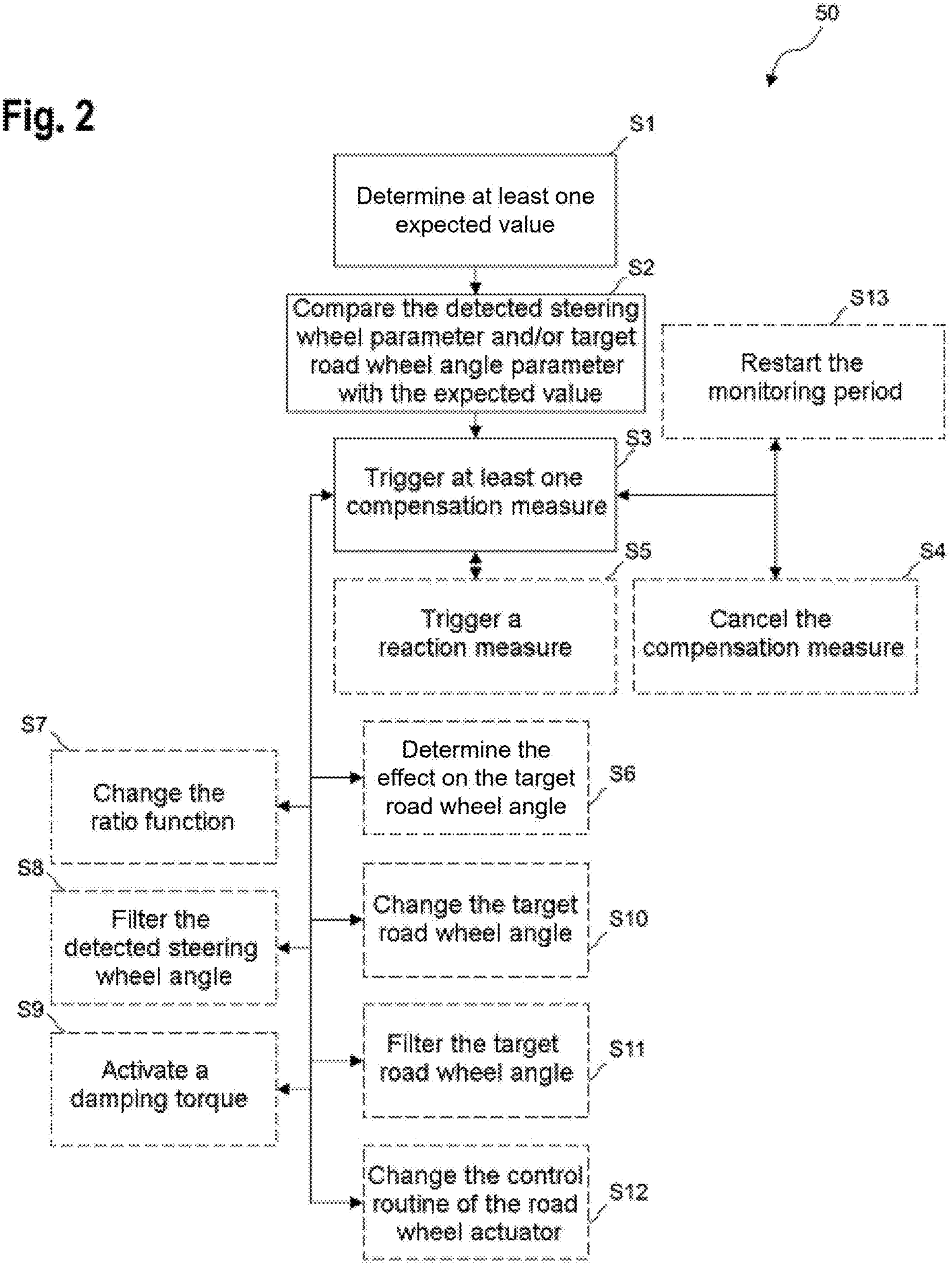
FIG. 2 is a flowchart representative of example machine-readable instructions and/or example operations that may be executed, instantiated, and/or performed by example programmable circuitry to implement example methods disclosed herein for operating a vehicle including an electronic steering system.

FIG. 2 is a flowchart representative of example machine-readable instructions and/or example operations that can be executed, instantiated, and/or performed by example programmable circuitry to implement the example method 50 for a vehicle 10 including an electronic steering system 12 . . . . Optional operations are illustrated by dashed lines. In operation S1, at least one expected value is determined by the control device 42, the expected value is associated with a steering wheel parameter and/or a target road wheel parameter.

In some examples, the expected value can be variable, and can depend, for example, on vehicle parameters, a driving situation, or a vehicle personalization mode. Corresponding information for determining the driving situation, the vehicle personalization mode, or the vehicle parameters can be received by the control device 42 from corresponding sensors, or alternatively from a superordinate driving control device (not shown) of the vehicle 10. For example, the expected value for a high speed driving situation can differ from an expected value for a city driving situation.

In some examples, the steering wheel parameter can be a steering wheel rotational speed or a steering wheel speed change. Accordingly, the expected value can reflect an expected steering wheel rotational speed or an expected steering wheel speed change.

In some examples, the target road wheel angle parameter can be a target road wheel angular speed or a change in the target road wheel angular speed. In a corresponding manner, the expected value can then reflect the expected target road wheel angular speed or the change in the target road wheel angular speed.

In some examples, several expected values (e.g., partial expected values) for different parameters of the electronic system 12 can also be determined. The method 50 can then be applied in a corresponding manner for each of the different expected values.

In operation S2, at least one detected steering wheel parameter and/or a detected target road wheel angle parameter is compared with the at least one expected value associated therewith via the control device 42. It is therefore evaluated to what extent the actual steering wheel parameter or target road wheel angle parameter corresponds to the expected value, exceeds this expected value or falls short of this expected (e.g., depending on the definition). The comparison can be carried out by the control device 42 via conventional electrical, electronic components (e.g., data processing devices, a comparator, or the like) or software.

In the following operation S3, if the at least one detected steering wheel parameter and/or detected target road wheel parameter exceeds or falls short of the expected value associated therewith, at least one compensation measure is triggered by the control device 42 so that a change in a road wheel angle of the at least one steerable road wheel 14 towards the target road wheel angle on the basis of the detected steering wheel angle is at least delayed or damped. Of course, to "exceed" or "fall short" here does not mean that the detected parameter of the electronic steering system 12 is simply merely smaller or larger than the expected value. Instead, it means that the relative size relationship between the detected parameter of the electronic steering system 12 and the associated expected value is inverted from one control period to the next control period. This means that the control device 42 establishes, for example, whether there is a change of sign when calculating the difference between the detected parameter and the expected value. This is understood to indicate that an unexpected operating condition of the electronic steering system 12 has occurred. Consequently, the at least one compensation measure can be used to delay, reduce or damp the effects of the unexpected operating condition when changing the road wheel angle. In other words, a more indirect mode of operation of the electronic steering system 12, for example, the setting of the road wheel angle, is induced.

In some examples, if the detected parameter of the electronic steering system 12 has exceeded or fallen short of the expected value for the first time, the control device 42 monitors whether the detected parameter exceeds or falls short of the expected value again within a subsequent monitoring (e.g., time) period.

In some examples, the monitoring period is variable. For example, the monitoring period can depend on a vehicle parameter, the driving situation, a vehicle personalization mode, and/or the extent to which the detected parameter exceeds or falls short of the expected value.

If the detected parameter of the electronic steering system 12 does not exceed or fall short of the expected value again within the monitoring period, the compensation measure, which was triggered in operation S3, is canceled by the control device 42 according to the optional operation S4. As a result, the electronic steering system 12 reverts directly to its original configuration.

However, if the detected parameter of the electronic steering system 12 exceeds or falls short of the expected value again within the monitoring period, the monitoring period is restarted by the control device 42, see operation S13.

If an unexpected operating condition is identified within the monitoring period via a system diagnosis, a reaction measure is triggered by the control device 42 according to the optional operation S5.

The reaction measure aims to bring the electronic control system 12 into a usable but robust condition. To this end, the control device 42 can be configured to determine, via a system diagnosis, which components of the electronic steering system 12 have caused the unexpected operating condition. For example, complementary measurement data from sensors of the vehicle 10 can reveal that a specific steering channel of the electronic steering system 12 or a steering wheel sensor 36 is causing the unexpected operating condition. Typically, the electronic steering system 12 has redundant components, so that individual components of the electronic steering system 12, for example, a control device of a specific steering channel, can be deactivated. The reaction measure can also include switching to a more suitable system configuration of the electronic steering system 12, which can correspond, by analogy, to a protected mode (e.g., like that of computers). In some examples, the reaction measure can also include outputting a report for the driver of the vehicle 10. The report can be output to the driver via a display and/or a speaker belonging to the vehicle 10, for example. In any case, the reaction measure includes terminating the compensation measure triggered in operation S3 via the control device 42.

The method 50 can also be implemented via the optional operation S6, in which an effect of the unexpected operating condition of the electronic steering system 12 is determined by the control device 42. The control device 42 can determine the extent to which the detected parameter of the electronic steering system 12 exceeds or falls short of the expected value (e.g., the amount of the relative change in value). The greater the relative change in value (e.g., change of sign when calculating the difference), the more dramatic the effects on the target road wheel angle. However, by determining the effects of the unexpected operating condition, the control device 42 can then adapt the compensation measure accordingly to reduce, delay, or damp the effects during the lateral control of the vehicle 10. This means that the compensation measure can be adapted according to the severity of the unexpected operating condition via the control device 42.

The compensation measure in operation S3 can be implemented in a variety of ways. For example, according to the optional operation S7, a changed transfer function can be applied by the control device 42 during the determining of the target road wheel angle. The changed transfer function generally ensures a more indirect setting of the road wheel angle compared to the original (e.g., unchanged) transfer function. This effectively corresponds to damping the lateral control of the vehicle 10.

According to the optional operation S8, a filtering measure can also be applied to the detected steering wheel angle. For example, a low-pass filter can be used to filter the detected steering wheel angle. As a result, the effects on the lateral vehicle control during the determining of the target road wheel angle can be smoothed and optionally reduced in magnitude.

The operations S7 and S8 represent active compensation measures, in which an adaptation to the control of the electronic steering system 12 takes place.

According to the optional operation S9, the compensation measure can also be provided indirectly. Accordingly, an additional damping torque is provided for the driver at the steering wheel 30 during the torque response. The damping torque can be generally ensured via electrical or electronic measures (e.g., electrical resistance) or via mechanical resistance. This results in an increase in the inertia of the steering wheel 30. Consequently, with the same torque application, the steering wheel speed (e.g., the steering wheel speed change) is reduced compared to the configuration without a damping torque. This also induces the driver to react with steering inputs of smaller magnitude, whereby the consequences of the unexpected operating condition can be reduced more easily than they would be without these measures. Consequently, a possible overreaction on the part of the driver due to an unexpectedly induced steering wheel angle can be smaller than it would be without the damping torque.

It can therefore be avoided that the driver of the vehicle, due to an unexpected torque response (e.g., propagated by an unexpected target road wheel angle) overreacts to the unexpected self steering.

The damping torque can be produced, for example, via an electronic damping torque (e.g., induced electrical resistance) or a mechanical damping torque (e.g., additional mechanical friction).

According to the optional operation S10, the compensation measure can also include modifying the target road wheel angle. For example, a correction factor can be used to make the determining of the target road wheel angle depending on the detected steering wheel angle more indirect than it would be without the modification.

The method 50 can further include the optional operation S11, in which filtering is considered during the determining of the target road wheel angle. For example, the filtering can be in the form of low-pass filtering. This also induces the target road wheel angle to be determined more indirectly, for example, in a delayed manner compared to the configuration without a filtering measure. Consequently, the control of the road wheel actuator 19 is adapted such that the road wheel angle change towards the target road wheel angle takes place gradually (e.g., more indirectly).

The compensation measure can also be produced via the optional operation S12, in which a control routine of the road wheel actuator 18 is varied. The road wheel actuator 18 can then use another characteristic when setting the road wheel angle, whereby it is directly possible to generally ensure a more indirect setting of the road wheel angle. Corresponding characteristics can be stored, for example, in the storage device 46.

In some examples, the compensation measure can also include several of the described optional operations.

Figure 3:
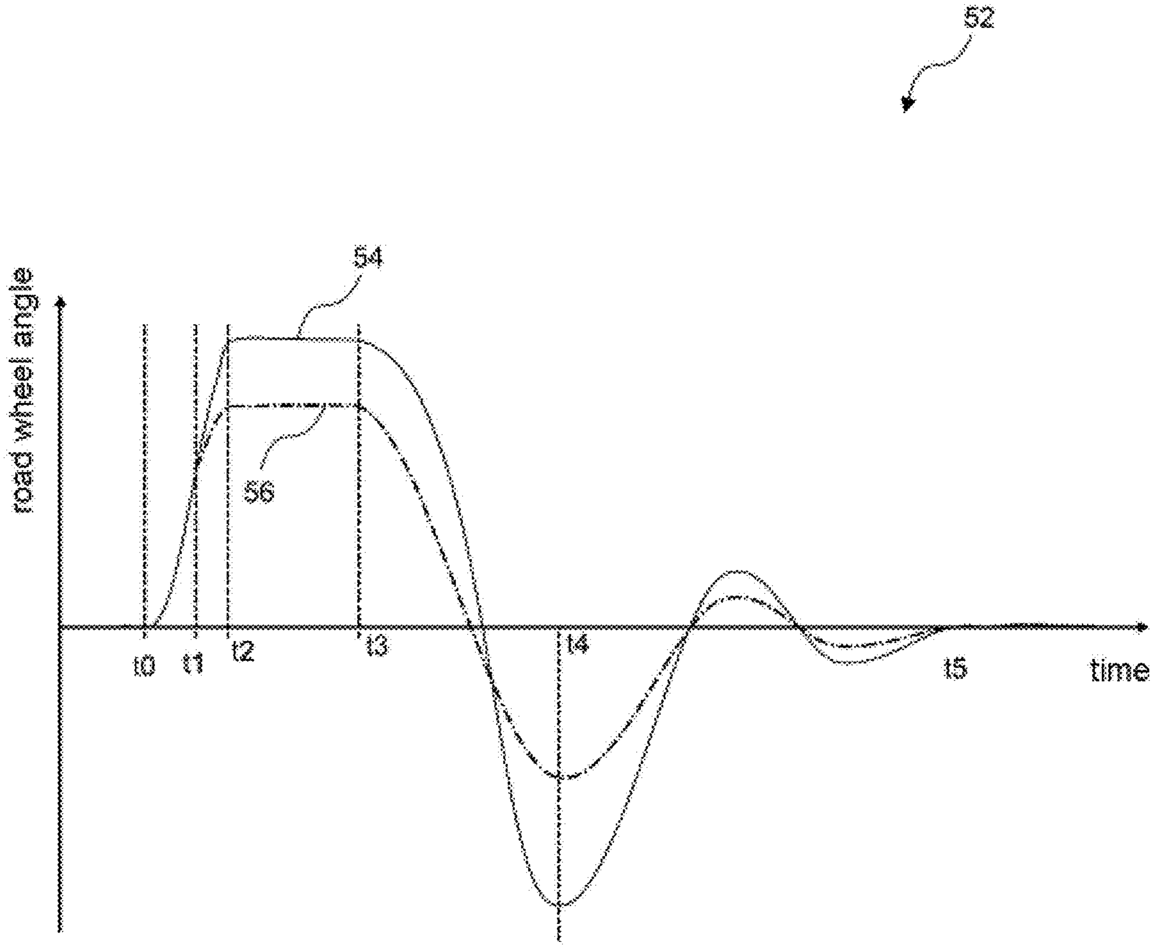
FIG. 3 shows a schematic illustration of progressions of the road wheel angle in association with the example method of FIG. 2.

FIG. 3 shows a schematic illustration 52 of curves of the road wheel angle in association with the method 50. On the y axis, the wheel angle change of the steerable road wheels 14 is plotted against the time on the x axis. 54 shows the curve of the road wheel angle without a compensation measure. In contrast, 56 denotes the curve of the road wheel angle of the steerable road wheels 14, in which, at the time t1, the control device 42 applies a compensation measure which, for example, corresponds to a change in the transfer function.

The time to denotes the start of the unexpected operating condition. The control device 42 requires a certain time period to detect the unexpected operating condition, for example, based on the comparison between the detected parameter and the expected value associated therewith, and to determine and trigger appropriate measures. At the time t1, the appropriate compensation measure or several appropriate compensation measures is/are triggered by the control device 42.

At the time t1, as a compensation measure, the transfer function is changed by the control device 42 in such a way that only a more indirect reaction of the road wheel angle change to the steering wheel angle change is induced. This results in the road wheel angle change, based on the steering wheel angle change being smaller in magnitude for the curve 56 (e.g., with the changed transfer function) than it would be for the curve 54 (e.g., unchanged transfer function).

At the time t2, the road wheel angle no longer changes, but instead remains constant, which can be attributed to the reaction torque of the driver of the vehicle 10. Since the curve 56 of the road wheel angle (e.g., with the changed transfer function) is smaller in magnitude than the unchanged curve 54, this results in the vehicle 10 following the original trajectory requested by the driver more closely, with a reduction in the path divergence (e.g., distance) therefrom.

At the time t3, the driver of the vehicle 10 begins to correct the path of the vehicle 10 by counter-steering to return to the desired trajectory. In this phase, the road wheel angle change based on the counter-steering movement (e.g., due to the unchanged transfer function) is smaller in magnitude than it is for the curve 54 with the original transfer function. This results in a smaller overcorrection of the effects of the unexpected operating condition by the driver of the vehicle 10 (time t4).

At the time t5, the counter-steering by the driver of the vehicle 10 results in the curve 56 of the road wheel angle with the unchanged transfer function again being aligned with the desired trajectory.

The different configurations of the compensation measure enable abrupt changes during the lateral vehicle control and sudden changes in the road wheel angle to be minimized (e.g., avoided), reduced or damped.

All configurations of the method 50 enable a partial time period which is needed for the detection of unexpected operating conditions to be brought forward corresponding to the detection of corresponding parameters of the electronic steering system 12. As a result, the time frame for detecting the unexpected operating conditions or applying appropriate compensation measures can be increased. Consequently, the path divergence from the desired vehicle trajectory can be reduced without needing a high degree of complexity. Therefore, a method 50 is provided via which the comfort for the driver is increased and which enables the effects of the unexpected operating conditions to be reduced more quickly than with previous approaches.

Example instructions and/or operations of FIG. 2 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, a hard disk drive (HDD), a flash memory, a read-only memory (ROM), a compact disc (CD), a digital versatile disc (DVD), a cache, a random-access memory (RAM) of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random-access memory of any type, read-only memory of any type, solid-state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

Specific examples disclosed here use switching circuits (e.g., one or more switching circuits) to implement standards, protocols, methods or technologies disclosed herein, to couple two or more components in a functional manner, to generate information, to process information, to analyze information, to generate signals, to code/decode signals, to convert signals, to transmit and/or receive signals, to control other devices, etc. Circuits of any type can be used.

In one example, a circuit such as the control device includes one or more data processing devices, such as a processor (e.g., a microprocessor), a central processing unit (CPU), a digital signal processor (DSP), an application-specific integrated circuit (ASIC), a field-programable gate array (FPGA), a system on a chip (SoC) or the like or any combinations thereof and can comprise discrete digital or analog circuit elements or electronics or combinations thereof. In one example, the circuit includes hardware circuit implementations (e.g., implementations in analog circuits, implementations in digital circuits and the like and combinations thereof).

In one example, switching circuits include combinations of switching circuits and computer program products having software or firmware instructions which are stored on one or more computer-readable memories and cooperate to prompt a device to execute one or more of the protocols, methods or technologies described herein. In one example, the circuit technology includes switching circuits (e.g. microprocessors or parts of microprocessors) which require software, firmware and the like to operate. In one example, the switching circuits include one or more processors or parts thereof and the associated software, firmware, hardware and the like.

Figure 4:
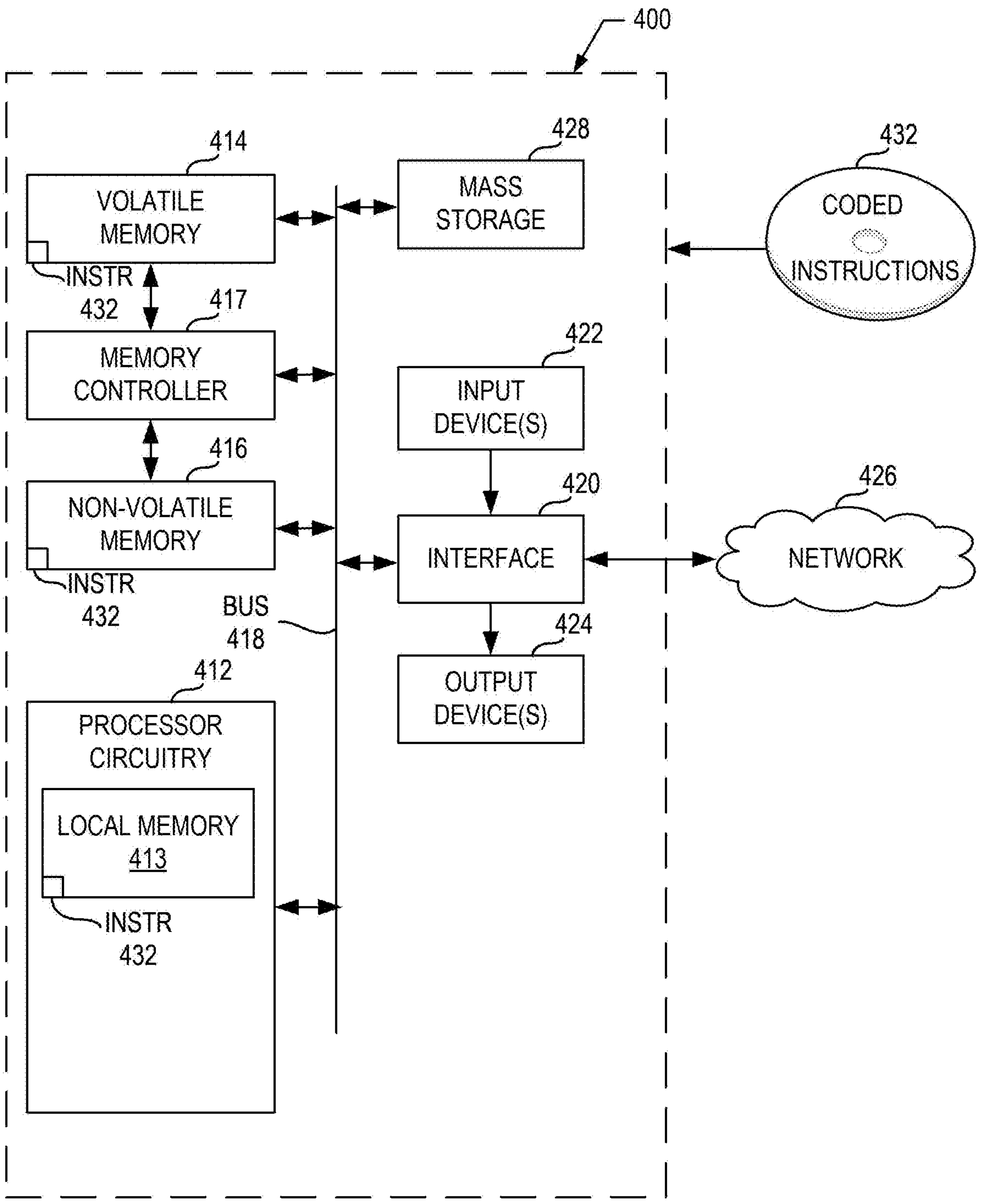
FIG. 4 is a block diagram of an example processing platform including programmable circuitry structured to execute, instantiate, and/or perform the example machine readable instructions of FIG. 2.

FIG. 4 is a block diagram of an example programmable circuitry platform 400 structured to execute and/or instantiate the example machine-readable instructions and/or the example operations of FIG. 2 to implement the control device 42 and/or its various components disclosed herein. The programmable circuitry platform 400 can be, for example, a control device, an ECU, a self-learning machine (e.g., a neural network), or any other type of computing and/or electronic device.

The programmable circuitry platform 400 of the illustrated example includes programmable circuitry 412. The programmable circuitry 412 of the illustrated example is hardware. For example, the programmable circuitry 412 can be implemented by one or more integrated circuits, logic circuits, FPGAs, microprocessors, CPUs, graphic processor units (GPUs), video processor units (VPUs), DSPs, and/or microcontrollers from any desired family or manufacturer. The programmable circuitry 412 may be implemented by one or more semiconductor based (e.g., silicon based) devices.

The programmable circuitry 412 of the illustrated example includes a local memory 413 (e.g., a cache, registers, etc.). The programmable circuitry 412 of the illustrated example is in communication with main memory 414, 416, which includes a volatile memory 414 and a non-volatile memory 416, by a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 416 may be implemented by flash memory and/or any other desired type of memory device. Access to the main memory 414, 416 of the illustrated example is controlled by a memory controller 417. In some examples, the memory controller 417 may be implemented by one or more integrated circuits, logic circuits, microcontrollers from any desired family or manufacturer, or any other type of circuitry to manage the flow of data going to and from the main memory 414, 416.

The programmable circuitry platform 400 of the illustrated example also includes interface circuitry 420. The interface circuitry 420 may be implemented by hardware in accordance with any type of interface standard, such as a controller area network (CAN), an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 422 are connected to the interface circuitry 420. The input device(s) 422 permit(s) a user (e.g., a human user, a machine user, etc.) to enter data and/or commands into the programmable circuitry 412. The input device(s) 422 can be implemented by, for example, an audio sensor, a microphone, a camera (still or video), a button, a touchscreen, and/or a voice recognition system.

One or more output devices 424 are also connected to the interface circuitry 420 of the illustrated example. The output device(s) 424 can be implemented, for example, by display devices (e.g., a light emitting diode (LED), an organic light emitting diode (OLED), a liquid crystal display (LCD), an in-place switching (IPS) display, a touchscreen, etc.), a tactile output device, and/or speaker. The interface circuitry 420 of the illustrated example, thus, typically includes a graphics driver card, a graphics driver chip, and/or graphics processor circuitry such as a GPU.

The interface circuitry 420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 400 of the illustrated example also includes one or more mass storage discs or devices 428 to store firmware, software, and/or data. Examples of such mass storage discs or devices 428 include magnetic storage devices (e.g., floppy disk, drives, hard disk drives (HDDs), etc.), optical storage devices (e.g., Blu-ray disks, CDs, DVDs, etc.), RAID systems, and/or solid-state storage discs or devices such as flash memory devices and/or solid state drives (SSDs).

The machine-readable instructions 432, which may be implemented by the machine-readable instructions of FIG. 2, may be stored in the mass storage device 428, in the volatile memory 414, in the non-volatile memory 416, and/or on at least one non-transitory computer readable storage medium such as a CD or DVD which may be removable.

In the described examples, reference can be made to quantities and numbers. Unless specifically stated, such quantities and numbers should not be considered limiting but as examples of the possible quantities or numbers in association with the disclosure. In this connection, the word "multiplicity" can also be used in the disclosure to indicate a quantity or number. In this regard, the word "multiplicity" is used to mean any number which is greater than one, e.g. two, three, four, five, etc. The expressions "for instance", "approximately", "close to", etc. mean plus or minus 5% of the specified value.

Although the disclosure has been illustrated and described in relation to one or more examples, after reading and understanding this description and the accompanying drawings, a person skilled in the art will be able to make equivalent changes and modifications.

Example methods, apparatus, systems, and articles of manufacture to enable operating a vehicle including an electronic steering system and electronic steering systems for a vehicle are disclosed herein. Further examples and combinations thereof include the following:

Example 1 includes a method for operating a vehicle including an electronic steering system, the method comprising determining an expected value, associated with a steering wheel parameter, comparing a detected steering wheel parameter with the expected value, and if the detected steering wheel parameter exceeds the expected value, triggering at least one compensation measure so that a change in a road wheel angle of a steerable road wheel of the vehicle towards a target road wheel angle is damped.

Example 2 includes the method of example 1, wherein the compensation measure is cancelled if the detected steering wheel parameter, after initially exceeding the expected value associated, does not exceed the expected value again within a monitoring period.

Example 3 includes the method of example 2, wherein the monitoring period is restarted if the detected steering wheel parameter after initially exceeding the expected value, exceeds the expected value again within the monitoring period.

Example 4 includes the method of example 1, further including triggering a reaction measure if an unexpected operating condition in the electronic steering system is identified within a monitoring period.

Example 5 includes the method of example 3, wherein the reaction measure includes cancelling the compensation measure.

Example 6 includes the method of example 3, wherein the reaction measure includes deactivating an inoperable control device of the electronic steering system.

Example 7 includes the method of example 3, wherein the reaction measure includes outputting a report to a user of the vehicle.

Example 8 includes the method of example 1, wherein the steering wheel parameter includes a steering wheel rotational speed.

Example 9 includes the method of example 1, wherein the steering wheel parameter includes a steering wheel speed change.

Example 10 includes the method of example 1, wherein the expected value is variable.

Example 11 includes the method of example 1, wherein the expected value depends on a driving situation.

Example 12 includes the method of example 1, wherein the expected value depends on a vehicle personalization mode.

Example 13 includes the method of example 1, wherein the compensation measure includes at least one of the following changing an original transfer function to a changed transfer function, filtering a detected steering wheel angle, activating a damping torque which is applied to a steering wheel or to a component coupled thereto, modifying a target road wheel angle, filtering the target road wheel angle, or changing a control routine of a road wheel actuator.

Example 14 includes an electronic steering system for a vehicle comprising machine readable instructions, and a control device to execute the machine readable instructions to determine an expected value, associated with a target road wheel angle parameter, compare a detected target road wheel angle parameter with the expected value, and if the detected target road wheel angle parameter exceeds the expected value, trigger at least one compensation measure so that a change in a road wheel angle of a steerable road wheel towards a target road wheel angle is damped.

Example 15 includes the electric steering system of example 14, wherein the compensation measure is cancelled if the detected target road wheel angle parameter, after initially exceeding the expected value associated, does not exceed the expected value again within a monitoring period.

Example 16 includes the electric steering system of example 14, further including triggering a reaction measure if an unexpected operating condition in the electronic steering system is identified within a monitoring period.

Example 17 includes the electric steering system of example 16, wherein the reaction measure includes cancelling the compensation measure.

Example 18 includes the electric steering system of example 16, wherein the reaction measure includes deactivating an inoperable control device of the electronic steering system.

Example 19 includes the electric steering system of example 16, wherein the reaction measure includes outputting a report to a user of the vehicle.

Example 20 includes a non-transitory machine readable storage medium comprising instructions to cause programmable circuitry to at least determine an expected value, associated with a steering wheel parameter, compare a detected steering wheel parameter with the expected value, and if the detected steering wheel parameter exceeds the expected value, trigger at least one compensation measure so that a change in a road wheel angle of a steerable road wheel of a vehicle towards a target road wheel angle is damped.

What is claimed is:

1. A method for operating a vehicle including an electronic steering system, the method comprising:
- determining an expected value, associated with a steering wheel parameter;
- comparing a detected steering wheel parameter with the expected value; and
- if the detected steering wheel parameter exceeds the expected value, triggering at least one compensation measure so that a change in a road wheel angle of a steerable road wheel of the vehicle towards a target road wheel angle is damped.

2. The method of claim 1, wherein the compensation measure is cancelled if the detected steering wheel parameter, after initially exceeding the expected value associated, does not exceed the expected value again within a monitoring period.

3. The method of claim 2, wherein the monitoring period is restarted if the detected steering wheel parameter after initially exceeding the expected value, exceeds the expected value again within the monitoring period.

4. The method of claim 1, further including triggering a reaction measure if an unexpected operating condition in the electronic steering system is identified within a monitoring period.

5. The method of claim 4, wherein the reaction measure includes cancelling the compensation measure.

6. The method of claim 4, wherein the reaction measure includes deactivating an inoperable control device of the electronic steering system.

7. The method of claim 4, wherein the reaction measure includes outputting a report to a user of the vehicle.

8. The method of claim 1, wherein the steering wheel parameter includes a steering wheel rotational speed.

9. The method of claim 1, wherein the steering wheel parameter includes a steering wheel speed change.

10. The method of claim 1, wherein the expected value is variable.

11. The method of claim 1, wherein the expected value depends on a driving situation.

12. The method of claim 1, wherein the expected value depends on a vehicle personalization mode.

13. The method of claim 1, wherein the compensation measure includes at least one of the following:
- changing an original transfer function to a changed transfer function;
- filtering a detected steering wheel angle;
- activating a damping torque which is applied to a steering wheel or to a component coupled thereto;
- modifying a target road wheel angle;
- filtering the target road wheel angle; or
- changing a control routine of a road wheel actuator.

14. An electronic steering system for a vehicle comprising:
- machine readable instructions; and
- a control device to execute the machine readable instructions to:
  - determine an expected value, associated with a target road wheel angle parameter;
- compare a detected target road wheel angle parameter with the expected value; and
- if the detected target road wheel angle parameter exceeds the expected value, trigger at least one compensation measure so that a change in a road wheel angle of a steerable road wheel towards a target road wheel angle is damped.

15. The electronic steering system of claim 14, wherein the compensation measure is cancelled if the detected target road wheel angle parameter, after initially exceeding the expected value associated, does not exceed the expected value again within a monitoring period.

16. The electronic steering system of claim 14, further including triggering a reaction measure if an unexpected operating condition in the electronic steering system is identified within a monitoring period.

17. The electronic steering system of claim 16, wherein the reaction measure includes cancelling the compensation measure.

18. The electronic steering system of claim 16, wherein the reaction measure includes deactivating an inoperable control device of the electronic steering system.

19. The electronic steering system of claim 16, wherein the reaction measure includes outputting a report to a user of the vehicle.

20. A non-transitory machine readable storage medium comprising instructions to cause programmable circuitry to at least:
- determine an expected value, associated with a steering wheel parameter;
- compare a detected steering wheel parameter with the expected value; and
- if the detected steering wheel parameter exceeds the expected value, trigger at least one compensation measure so that a change in a road wheel angle of a steerable road wheel of a vehicle towards a target road wheel angle is damped.

* * * * *